US010233083B2

(12) United States Patent
Fitzhugh

(10) Patent No.: US 10,233,083 B2
(45) Date of Patent: Mar. 19, 2019

(54) METHODS AND SYSTEMS FOR SEPARATING CARBON NANOTUBES

(71) Applicant: William Fitzhugh, Cambridge, MA (US)

(72) Inventor: William Fitzhugh, Cambridge, MA (US)

(*) Notice: Subject to any disclaimer, the term of this patent is extended or adjusted under 35 U.S.C. 154(b) by 0 days.

(21) Appl. No.: 16/028,066

(22) Filed: Jul. 5, 2018

(65) Prior Publication Data

US 2018/0327266 A1 Nov. 15, 2018

Related U.S. Application Data

(63) Continuation of application No. PCT/US2016/062900, filed on Nov. 18, 2016.

(60) Provisional application No. 62/278,072, filed on Jan. 13, 2016.

(51) Int. Cl.
| | | |
|---|---|---|
| *C01B 32/196* | (2017.01) | |
| *C01B 32/172* | (2017.01) | |
| *B82B 3/00* | (2006.01) | |
| *B03C 5/00* | (2006.01) | |
| *B82Y 40/00* | (2011.01) | |

(52) U.S. Cl.
CPC .......... *C01B 32/172* (2017.08); *B82B 3/0071* (2013.01); *B03C 5/005* (2013.01); *B82Y 40/00* (2013.01)

(58) Field of Classification Search
CPC ..... C01B 32/172; B82B 3/0071; B03C 5/005; B82Y 40/00
USPC .......................................................... 423/461
See application file for complete search history.

(56) References Cited

U.S. PATENT DOCUMENTS

| | | |
|---|---|---|
| 7,074,310 B2 | 7/2006 | Smalley et al. |
| 7,161,107 B2 | 1/2007 | Krupke et al. |
| 7,247,670 B2 | 7/2007 | Malenfant et al. |
| 8,097,141 B2 | 1/2012 | Schmidt et al. |
| 8,193,430 B2 | 6/2012 | Papadimitrakopoulos et al. |
| 8,246,928 B1 | 8/2012 | Rao et al. |
| 8,365,923 B2 | 2/2013 | Raston et al. |
| 8,697,026 B2 | 4/2014 | Tanaka et al. |
| 8,916,395 B2 | 12/2014 | Adiga et al. |

(Continued)

FOREIGN PATENT DOCUMENTS

| | | |
|---|---|---|
| WO | WO 2012/177222 A1 | 12/2012 |
| WO | WO 2014/136981 A1 | 9/2014 |

OTHER PUBLICATIONS

Burke, "Nanodielectrophoresis: Electronic Nanotweezers," Encyclopedia of Nanoscience and Nanotechnology, X:1-19 (2003).

(Continued)

*Primary Examiner* — Daniel McCracken
(74) *Attorney, Agent, or Firm* — Baker Botts L.L.P.

(57) ABSTRACT

Methods and systems for separating carbon nanotubes are provided. An exemplary method of separating semiconducting carbon nanotubes and metallic carbon nanotubes contained within a solution can include providing electromagnetic waves travelling in one or more resonance modes and scattering at least a portion of the electromagnetic waves to form an electric gradient with the scattered waves. The method can further include recycling at least a portion of the scattered waves to the one or more resonance modes and separating at least a portion of the semiconducting carbon nanotubes and the metallic carbon nanotubes using the electric gradient.

24 Claims, 4 Drawing Sheets

(56) References Cited

U.S. PATENT DOCUMENTS

| | | |
|---|---|---|
| 8,961,762 B2 | 2/2015 | Ihara et al. |
| 9,079,766 B1 | 7/2015 | Picconatto et al. |
| 9,079,775 B2 | 7/2015 | Howard et al. |
| 9,102,527 B2 | 8/2015 | Burke et al. |
| 9,114,995 B2 | 8/2015 | Wainerdi et al. |
| 2003/0042128 A1 | 3/2003 | Harutyunyan et al. |
| 2004/0191157 A1 | 9/2004 | Harutyunyan et al. |
| 2006/0231399 A1 | 10/2006 | Smalley et al. |
| 2006/0242741 A1 | 10/2006 | Krupke et al. |
| 2007/0075263 A1 | 4/2007 | Gorrell et al. |
| 2007/0095667 A1 | 5/2007 | Lau et al. |
| 2007/0264185 A1 | 11/2007 | Campbell et al. |
| 2009/0252946 A1* | 10/2009 | Marsh ............... B82Y 40/00 428/304.4 |
| 2009/0283405 A1 | 11/2009 | Schmidt et al. |
| 2010/0044227 A1 | 2/2010 | Kim et al. |
| 2011/0024333 A1* | 2/2011 | Han ............... B82Y 30/00 209/7 |
| 2011/0108422 A1 | 5/2011 | Heller et al. |
| 2011/0155649 A1 | 6/2011 | Mazur et al. |
| 2011/0174701 A1* | 7/2011 | Gallaway ............... B82Y 30/00 209/606 |
| 2013/0259085 A1 | 10/2013 | Green et al. |
| 2014/0346044 A1 | 11/2014 | Chi et al. |

OTHER PUBLICATIONS

Fitzhugh, Scalable Dielectrophoresis of Single Walled Carbon Nanotubes, Thesis, Jul. 24, 2015 (67 pages).

International Search Report dated Apr. 7, 2017 in International Application No. PCT/US16/62900.

Krupke et al., "Separation of Metallic from Semiconducting Single-Walled Carbon Nanotubes," Science, 301:344-347 (2003).

Krupke et al., "Thin Films of Metallic Carbon Nanotubes Prepared by Dielectrophoresis," Advanced Materials, 18:1468-1470 (2006).

Krupke et al., "Surface Conductance Induced Dielectrophoresis of Semiconducting Single-Walled Carbon Nanotubes," Nano Letters 4(8):1395-1399 (2004).

Mendes et al., "Brownian Dynamics Simulations of Single-Wall Carbon Nanotube Separation by Type Using Dielectrophoresis," J. Phys. Chem. B 112(25):7467-7477 (2008).

\* cited by examiner

FIGURE 2
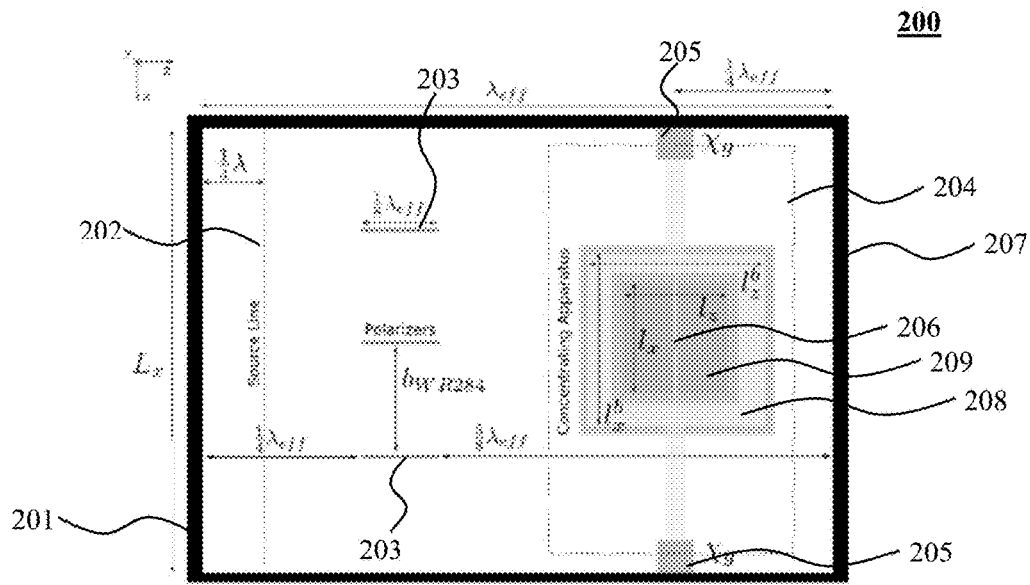
FIGURE 2A: *DEP Oven: (x,z) cross section*
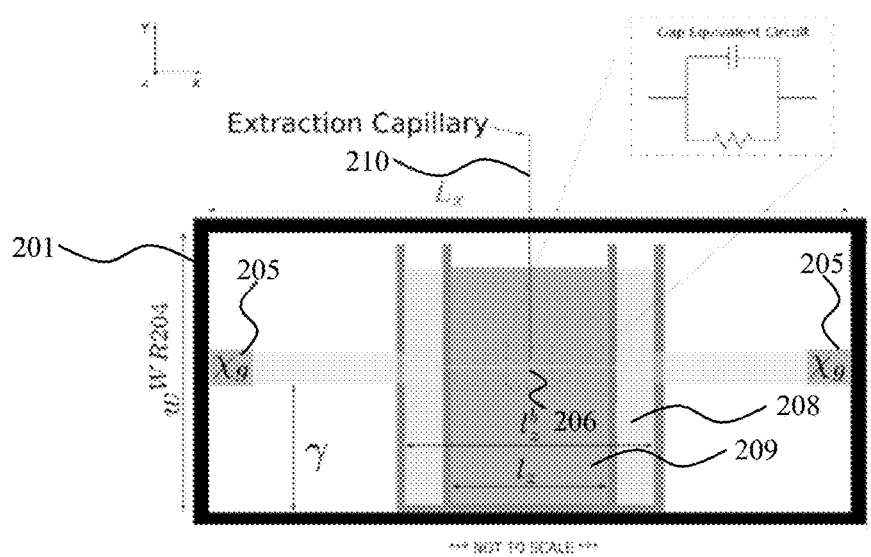
FIGURE 2B: *DEP Oven: (x,y) cross section*

METHODS AND SYSTEMS FOR SEPARATING CARBON NANOTUBES

CROSS-REFERENCE TO RELATED APPLICATIONS

This application is a Continuation of International Patent Application No. PCT/US2016/062900, filed Nov. 18, 2016, which claims priority to U.S. Provisional Application Ser. No. 62/278,072, filed Jan. 13, 2016, both of which are incorporated herein by reference in their entireties for all purposes.

FIELD

The disclosed subject matter relates to methods and systems for separating carbon nanotubes.

BACKGROUND

Carbon nanotubes are allotropes of carbon containing one or more layers of graphene rolled into a cylindrical shape. Although carbon nanotubes can have lengths of up to several millimeters, their diameters are on the nanoscale, e.g., from less than one nanometer to about 50 nanometers. Carbon nanotubes can exhibit important mechanical, electrical, and thermal properties, and therefore can have great potential in a variety of applications.

The specific structure of a carbon nanotube can determine its properties. For example, carbon nanotubes can be semiconducting or metallic, depending on the chiral angle of the graphene. Semiconducting carbon nanotubes and metallic carbon nanotubes can be useful for different applications, and thus it can be desirable to isolate carbon nanotubes based on these electrical properties. Such isolated carbon nanotubes can find use in, for example, supercapacitors, ion battery electrodes, fuel cells, solar cells, lightweight electromagnetic shielding, sensors, and transistors.

Certain methods of separating semiconducting carbon nanotubes and metallic carbon nanotubes are known in art. For example, gel electrophoresis or density gradient ultracentrifugation have been used to separate carbon nanotubes. However, these methods can be cumbersome and expensive. U.S. Pat. No. 7,161,107 describes a method of separating carbon nanotubes by performing dielectrophoresis on a solution containing carbon nanotubes and a solvent. The method applies a non-homogeneous electric alternating field to the solution to cause the carbon nanotubes to migrate and separate.

The dielectrophoretic force ($F_{DEP}$) that a particle experiences when dispersed in a solution is approximately proportional to the gradient of the applied electric field intensity profile ($E^2(\vec{r})$) multiplied by the Clausius Mossotti Function (CMF), as represented by Formula 1:

$$F_{DEP}(\vec{r}) \propto \Re[CMF]\nabla E^2(\vec{r}) \qquad \text{(Formula 1)}$$

The high frequency limit gives a dominating term of the Clausius Mossotti Function, and is approximated by Formula 2.

$$\lim_{\omega \to \infty} \Re[CMF] \to \frac{\epsilon_p - \epsilon_l}{\epsilon_l} \qquad \text{(Formula 2)}$$

In Formula 2, $\omega$ represents frequency, $\epsilon_p$ represents particle permittivity, and $\epsilon_l$ represents liquid permittivity. Thus, applying a non-homogeneous electric alternating field to a solution containing semiconducting carbon nanotubes and metallic carbon nanotubes, having particle permittivities $\epsilon_p^{(s)}$ and $\epsilon_p^{(m)}$, respectively, can separate the semiconducting carbon nanotubes and the metallic carbon nanotubes as long as one particle permittivity is less than the liquid permittivity and the other particle permittivity is greater than the liquid permittivity, as represented in Formula 3.

$$\epsilon_p^{(s)} < \epsilon_l < \epsilon_p^{(m)} \qquad \text{(Formula 3)}$$

In certain methods, the electric field is provided as an electromagnetic wave. However, due to its transience, only a small portion of the energy in the wave goes to separating the carbon nanotubes. Therefore, although such methods can separate semiconducting carbon nanotubes and metallic carbon nanotubes, it is accomplished at a loss of power.

Thus, there remains a need in the art for improved techniques for separating carbon nanotubes.

SUMMARY

The disclosed subject matter provides methods and systems for separating carbon nanotubes, e.g., semiconducting carbon nanotubes and metallic carbon nanotubes.

In certain embodiments, an exemplary method of separating semiconducting carbon nanotubes and metallic carbon nanotubes contained within a solution includes providing electromagnetic waves travelling in one or more resonance modes and scattering at least a portion of the electromagnetic waves to form an electric gradient with the scattered waves. The method can further include recycling at least a portion of the scattered waves to the one or more resonance modes and separating at least a portion of the semiconducting carbon nanotubes and the metallic carbon nanotubes using the electric gradient.

In certain embodiments, the method can further include removing at least one of the semiconducting carbon nanotubes and the metallic carbon nanotubes. In certain embodiments, the electromagnetic waves can be provided by a wave source. For example, the wave source can be a magnetron. In certain embodiments, the electromagnetic waves can travel in a single resonance mode. The electromagnetic waves can be scattered by a concentrating apparatus.

In certain embodiments, the solution can include a solvent. For example, the solvent can contain water, toluene, anisole, dimethylformamide (DMF), ethanol, benzene, acetone and/or combinations thereof. In certain embodiments, the particle permittivity of the metallic carbon nanotubes is not equal to the particle permittivity of the semiconducting carbon nanotubes. In particular embodiments, the solvent can have a liquid permittivity that is less than the particle permittivity of the metallic carbon nanotubes, but more than the particle permittivity of the semiconducting carbon nanotubes. In other particular embodiments, the solvent can have a liquid permittivity that is less than the particle permittivity of the metallic carbon nanotubes, and less than or about equal to the particle permittivity of the semiconducting carbon nanotubes.

In certain embodiments, the electromagnetic waves can have a frequency from about 300 MHz to about 300 GHz. For example, the electromagnetic waves can have a frequency from about 2 GHz to about 4 GHz.

The presently disclosed subject matter also provides systems for separating semiconducting carbon nanotubes and metallic carbon nanotubes within a cavity. An exemplary system can include a wave source, adapted for placement within the cavity, for providing electromagnetic waves to the cavity. At least a portion of the electromagnetic waves can travel in a resonance mode. The system can further include a concentrating apparatus, adapted for placement within the cavity, for scattering the electromagnetic waves, and a sample chamber within the concentrating apparatus. The sample chamber can include a solution containing the semiconducting carbon nanotubes and the metallic carbon nanotubes, and at least a portion of the scattered waves can travel through the sample chamber.

In certain embodiments, the length of the cavity can be an integer half multiple of the effective transverse wavelength ($\lambda_{eff}$) of the electromagnetic waves. In certain embodiments, the length of the cavity can be equal to the effective transverse wavelength of the electromagnetic waves. The system can further include one or more polarizers for attenuating any electromagnetic waves that are not traveling in the resonance mode. The polarizers can have a width of $\frac{1}{8}\lambda_{eff}$. The wave source can be located a distance of $\frac{1}{4}\lambda_{eff}$ from a first end of the cavity. The scattering apparatus can further include one or more concentrators. The concentrator(s) can be located a distance of $\frac{1}{4}\lambda_{eff}$ from a second end of the cavity that is opposite the first end.

In certain embodiments, the wave source can be a magnetron. The sample chamber can be located within a cooling bath that is also within the concentrating apparatus. The system can further include a capillary for removing semiconducting carbon nanotubes and/or metallic carbon nanotubes from the sample chamber.

BRIEF DESCRIPTION OF THE FIGURES

FIG. 2. A system for separating carbon nanotubes according to one exemplary embodiment of the disclosed subject matter. FIG. 2A is a cross-sectional view along an x-z plane and FIG. 2B is a cross-section view along an x-y plane.

DETAILED DESCRIPTION

The presently disclosed subject matter provides techniques for separating carbon nanotubes, e.g., semiconducting carbon nanotubes and metallic carbon nanotubes. The disclosed methods and systems can be used to isolate semiconducting carbon nanotubes and metallic carbon nanotubes.

As used herein, the singular forms "a," "an" and "the" include plural referents unless the context clearly dictates otherwise. Thus, for example, "a," "an" and "the" can mean "one or more."

As used herein, the term "about" or "approximately" means within an acceptable error range for the particular value as determined by one of ordinary skill in the art, which will depend in part on how the value is measured or determined, i.e., the limitations of the measurement system. For example, "about" can mean a range of up to 20%, up to 10%, up to 5%, and or up to 1% of a given value.

As used herein, the phrase "at least a portion" can refer to any fraction, section, or division of an entire amount. For example, "at least a portion" can mean at least 1%, at least 5%, at least 10%, at least 20%, at least 30%, at least 40%, at least 50%, at least 60%, or at least 70%. In certain circumstances, "at least a portion" can mean the entirety or 100% of an amount.

Figure 1:
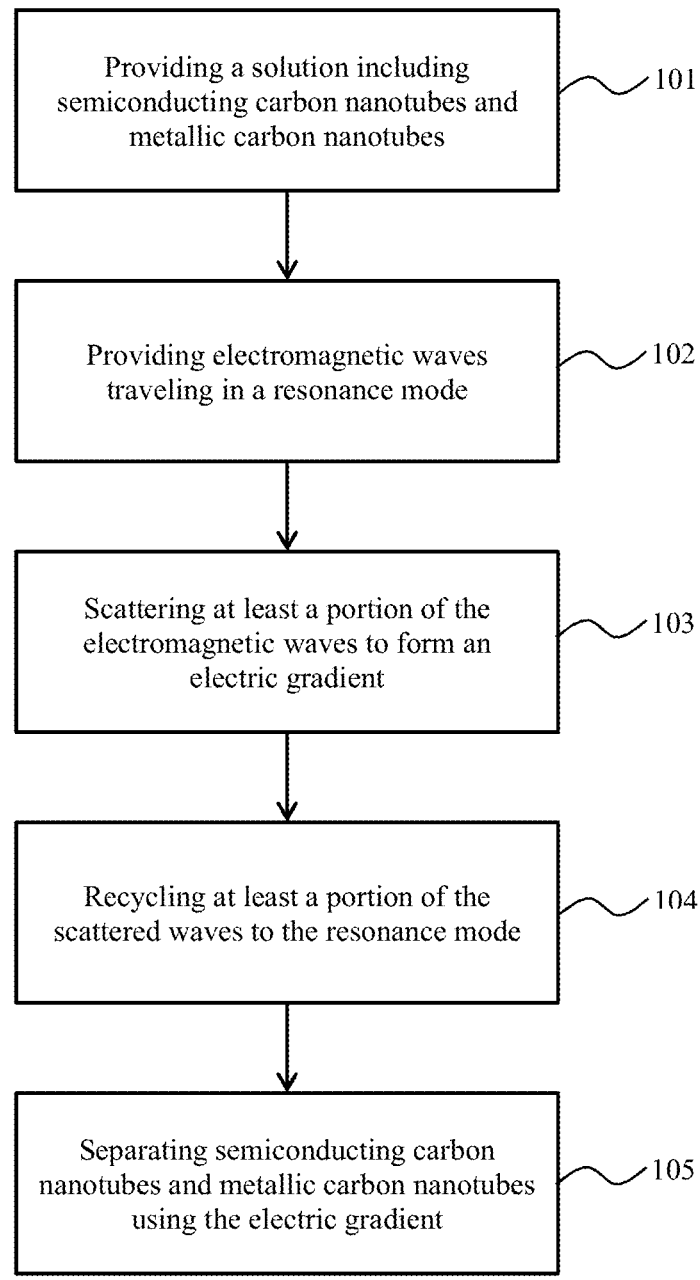
FIG. 1. A method of separating carbon nanotubes according to one exemplary embodiment of the disclosed subject matter.

The presently disclosed subject matter provides methods of separating carbon nanotubes. FIG. 1 provides a schematic illustration of an exemplary method according to the disclosed subject matter. In certain embodiments, a method 100 can include providing a solution including semiconducting carbon nanotubes and metallic carbon nanotubes 101. The carbon nanotubes can be single walled carbon nanotubes. For example, the carbon nanotubes can be semiconducting single walled carbon nanotubes (s-SWNTs) and metallic single walled carbon nanotubes (m-SWNTs). Alternatively, the carbon nanotubes can be multi walled carbon nanotubes. In certain embodiments, the carbon nanotubes can be a mixture of single walled and multi walled carbon nanotubes.

In certain embodiments, the solution can include semiconducting carbon nanotubes and metallic carbon nanotubes. The semiconducting carbon nanotubes can have a particle permittivity represented by $\in_p^{(s)}$, and the metallic carbon nanotubes can have a particle permittivity represented by $\in_p^{(m)}$. In certain embodiments, $\in_p^{(m)}$ is not equal to $\in_p^{(s)}$. For example, $\in_p^{(m)}$ can be greater than $\in_p^{(s)}$. In certain embodiments, $\in_p^{(m)}$ can be much greater than $\in_p^{(s)}$, as represented by Formula 4.

$$\in_p^{(s)} << \in_p^{(m)} \quad \text{(Formula 4)}$$

By way of example, and not limitation, $\in_p^{(m)}$ can be greater than $\in_p^{(s)}$ by at least one order of magnitude or at least two orders of magnitude. The particle permittivities $\in_p^{(m)}$ and $\in_p^{(s)}$ are the relative permittivities of the particles with respect to a vacuum. For example, in particular embodiments where the particles are metallic single-walled carbon nanotubes, $\in_p^{(m)}$ can range from about 100 to about 100,000, or from about 1,000 to about 10,000. In particular embodiments where the particles are semiconducting single-walled carbon nanotubes, $\in_p^{(s)}$ can range from about 1 to about 15, or from about 2 to about 5.

In certain embodiments, the solution can further include a solvent. In certain embodiments, the solvent can have a liquid permittivity represented by $\in_l$. The liquid permittivity $\in_l$ is the relative permittivity of the liquid with respect to a vacuum. As used herein, "particle permittivity" and "liquid permittivity" can alternatively be termed the "dielectric constant." In certain embodiments, $\in_l$ can be less than $\in_p^{(m)}$ and more than $\in_p^{(s)}$, as represented by Formula 3, described above. In other certain embodiments, $\in_l$ can be less than or equal to $\in_p^{(s)}$, as represented by Formula 5.

$$\in_l \leq \in_p^{(s)} < \in_p^{(m)} \quad \text{(Formula 5)}$$

The solvent for use in the presently disclosed subject matter can be any suitable polar or non-polar solvent. By way of example, and not limitation, the solvent can include water, toluene, anisole, dimethylformamide (DMF), ethanol, benzene, acetone, or a combination thereof. By way of example, $\in_l$ can range from about 1 to about 150, from about 2 to about 100, or from about 4 to about 80, depending on the composition of the solvent. In certain embodiments, the solvent can be water, which has an $\in_l$ of about 80. In other certain embodiments, the solvent can be a mixture of toluene and anisole having an $\in_l$ from about 2 to about 5. In certain embodiments, a mixture of toluene and anisole can have an $\in_l$ of about 4.

With further reference to FIG. 1, the method 100 can include providing electromagnetic waves traveling in a resonance mode 102. For example, the electromagnetic waves can be supplied by a wave source. As used herein, a wave source can alternatively be termed a "power source." In certain embodiments, the electromagnetic waves can have a frequency of greater than about 1 MHz. In certain embodiments, the electromagnetic waves are microwaves, i.e., electromagnetic waves having a frequency from about 300 MHz to about 300 GHz. For example, the microwaves can have a frequency from about 300 MHz to about 100 GHz, from about 500 MHz to about 15 GHz, from about 1 GHz to about 10 GHz, or from about 2 GHz to about 4 GHz. In particular embodiments, the electromagnetic waves can have a frequency of about 2.45 GHz. In certain embodiments, microwaves can be particularly suited to the disclosed methods because microwaves have wavelengths from about 1 mm to about 100 m, which can form a standing wave within a cavity resonator, as discussed below. In certain embodiments, the microwaves can have wavelengths from about 1 mm to about 1 m.

In certain embodiments, the electromagnetic waves are provided to a cavity resonator. The electromagnetic waves can travel in a resonance mode, i.e., can form standing waves such that the electric field vector points in a fixed direction. In certain embodiments, any electromagnetic waves that are not traveling in the resonance mode can be attenuated, e.g., by polarizers or internal structures within the cavity. In certain embodiments, the electromagnetic waves can travel in multiple resonance modes.

With further reference to FIG. 1, the method 100 can include scattering at least a portion of the electromagnetic waves to form an electric gradient 103. For example, the electromagnetic waves traveling in the resonance mode can be described as the incident waves. At least a portion of the incident waves can be scattered by a concentrating apparatus within the cavity to form scattered waves. As described below, the solution containing the carbon nanotubes can be located between the tips of two concentrators, i.e., conductors, within the concentrating apparatus. As a result of scattering the incident waves, equal and opposite electric fields will form along the surface of the concentrators, and opposite charges will accumulate on the tips of the concentrators. This charge differential can cause the incident and scattered waves to constructively interfere in the gap between the concentrators, thus creating the electric gradient within the solution. The electric gradient can be an isolated non-homogeneous electric field within the sample chamber (see, e.g., Example 3).

The method 100 can include recycling at least a portion of the scattered waves to the resonance mode 104. For example, at least a portion of the scattered waves can be reflected to the polarizers such that any scattered waves which are not traveling in the resonance mode are attenuated. The polarizers ensure that all waves travel in a single resonance mode. Recycling the scattered waves to the resonance mode can capture energy that would otherwise be released to free space if the cavity was open to free space. This can provide increased efficiency by reducing the amount of power needed to separate a certain amount of carbon nanotubes. A person having ordinary skill in the art will appreciate that the presently disclosed method can be operable with waves traveling in multiple resonance modes, and thus the scattered waves need not be recycled to a single resonance mode. In such embodiments, the scattered waves can be recycled to multiple resonance modes, e.g., by the natural attenuation of waves within a cavity resonator.

The method 100 can include separating semiconducting carbon nanotubes and metallic carbon nanotubes using the electric gradient 105. In certain embodiments, at least a portion of the semiconducting carbon nanotubes are separated from the metallic carbon nanotubes. The carbon nanotubes can be separated by dielectrophoresis. For example, and with reference to Formula 3, if the semiconducting carbon nanotubes have a particle permittivity ($\in_p^{(s)}$) that is less than the liquid permittivity of the solvent ($\in_l$) and the metallic carbon nanotubes have a particle permittivity ($\in_p^{(m)}$) that is more than the liquid permittivity of the solvent, then the carbon nanotubes can migrate to opposite ends of the electric gradient.

Alternatively, with reference to Formula 5, if the solvent has a liquid permittivity that is less than the particle permittivities of both the semiconducting carbon nanotubes and the metallic carbon nanotubes, the metallic carbon nanotubes, which can have a higher particle permittivity compared to the semiconducting carbon nanotubes (see Formula 4), will migrate to one end of the electric gradient. The semiconducting carbon nanotubes will also migrate to the same end of the electric gradient, but to a lesser extent, and therefore the solution will become highly concentrated with metallic carbon nanotubes at that end of the electric gradient. In either case, the metallic carbon nanotubes can migrate to a collection area to be extracted from the solution, resulting in an extract containing metallic carbon nanotubes.

In certain embodiments, the method can further include removing purified semiconducting carbon nanotubes and/or metallic carbon nanotubes, e.g., via a capillary. The methods of the presently disclosed subject matter can provide purified semiconducting carbon nanotubes and/or metallic carbon nanotubes.

In certain embodiments, the method can include removing an extract containing purified metallic carbon nanotubes from the solution. For example, the extract can contain greater than about 50%, greater than about 70%, greater than about 80%, greater than about 90%, greater than about 95%, greater than about 97%, greater than about 99%, or greater than about 99.9% metallic carbon nanotubes, as compared to semiconducting carbon nanotubes. A person having ordinary skill in the art will appreciate that the purity of the carbon nanotubes will depend on various factors, including for example the solvent composition, solvent liquid permittivity ($\in_l$), power input, and electric field intensity.

In certain embodiments, a higher purity extract can be produced. For example, the method can be performed using a first solution to create a first extract, and then repeated using the first extract to create a higher purity second extract. In certain embodiments, the method can be repeated for at least two cycles, at least three cycles, or at least four cycles. In certain embodiments, the method can be operated continuously, e.g., by continuously removing an extract and providing additional solution containing both semiconducting carbon nanotubes and metallic carbon nanotubes. Additionally, operating the method continuously can be further advantageous for increasing throughput.

The presently disclosed subject matter further provides systems for separating carbon nanotubes. For the purpose of illustration, and not limitation, FIG. 2 provides a schematic representation of an exemplary system according to the disclosed subject matter. With reference to FIG. 2, FIG. 2A is a cross-sectional view along an x-z plane and FIG. 2B is a cross-section view along an x-y plane.

The system 200 can be configured to minimize energy loss from the system. In certain embodiments, the system contains no outlets large enough for waves to escape from the system. In these embodiments, the system can be referred to as a "closed" system, while recognizing that certain energy losses are unavoidable. In certain embodiments, the system can include a cavity 201, which defines the boundaries of the system. The interior of the cavity can be made from a suitable conductive material, e.g., copper, silver, or gold. In particular embodiments, the interior of the cavity can be made from copper. In other certain embodiments, the interior of the cavity can be made from a dielectric material. In certain embodiments, the cavity includes one or more waveguides (see Example 2).

The system 200 can further include a wave source 202. The wave source can be any device suitable for supplying electromagnetic waves. In certain embodiments, the wave source can be one or more isotropic radiators. In certain embodiments, the wave source is suitable for supplying microwaves. For example, and not limitation, the wave source can include one or more magnetrons, klystrons, or vacuum tubes. In particular embodiments, the wave source includes one or more magnetrons. The wave source can operate at high power levels, e.g., in the kilowatt to megawatt power range.

Using a wave source that can supply microwaves provides certain advantages. Microwaves can have a wavelength from about 1 mm to about 1 m. In certain embodiments, the wavelength can be about 12.2 cm. Microwave wavelengths can be more manageable than other types of electromagnetic waves, such as radio waves (which can have wavelengths up to about 100,000 km) and infrared waves (which can have wavelengths from about 750 nm to about 1 mm). Furthermore, using a magnetron provides certain additional advantages. For example, magnetrons are a readily available and relatively inexpensive compared to certain other wave sources. Furthermore, magnetrons can reliably provide high power for the separation.

The wave source 202 can provide waves having a certain effective transverse wavelength to the cavity 201. The cavity can have a length that is equal to any integer (n) half multiple of the effective transverse wavelength ($\lambda_{\mathit{eff}}$), as represented by Formula 6:

$$\text{cavity length} = n \cdot \frac{\lambda_{\mathit{eff}}}{2} \qquad \text{(Formula 6)}$$

In certain embodiments, the cavity 201 can have a length equal to the effective transverse wavelength (see Example 1). For example, in FIG. 2A, the length of the cavity is equal to the effective transverse wavelength ($\lambda_{\mathit{eff}}$ in FIG. 2A). In these embodiments, the wave source 202, can be located at a distance of $\frac{1}{4}\lambda_{\mathit{eff}}$ from the wall of the cavity, such that waves traveling backwards from the wave source will travel one quarter wavelength, reflect (which absorbs one half wavelength) and travel one quarter wavelength back to the wave source (equaling a full wavelength).

The system 200 can further include at least two polarizers 203, i.e., internal structures within the cavity 201. In certain embodiments, the polarizers can be perpendicular to the wave source 202. With reference to FIG. 2, the polarizers can have a length of $\frac{1}{8}\lambda_{\mathit{eff}}$, where the length of the cavity is equal to the effective wavelength ($\lambda_{\mathit{eff}}$). In certain embodiments, the polarizers can be formed by placing two or more waveguides in parallel within the cavity and removing the interior walls such that only a length of $\frac{1}{8}\lambda_{\mathit{eff}}$ remains on each interior wall. In these embodiments, the distance between the polarizers will be equal to the width of the waveguides.

It should be noted that although this exemplary system 200 includes polarizers, polarizers are not required in all systems according to the disclosed subject matter. For example, a system could be designed to match the frequency of the wave source 203 to the size of the cavity 201, such that all waves travel in a resonance mode and polarizers are not needed to attenuate non-conforming waves. Further, as noted above, because systems according to the disclosed subject matter are operable with waves traveling in multiple resonance modes, the polarizers are not a necessary component of these systems as the cavity will naturally attenuate any waves not travelling in a resonance mode.

In certain embodiments, the system 200 can include a concentrating apparatus 204. The concentrating apparatus can include a pair of concentrators 205 separated by a small gap 206. Some waves can travel through the gap between the concentrators and provide an electric gradient to a sample chamber 208. Other waves can strike the concentrators and be reflected and recycled. In certain embodiments where the length of the cavity 207 is equal to the effective wavelength ($\lambda_{\mathit{eff}}$), the concentrators can be located at a distance of $\frac{1}{4}\lambda_{\mathit{eff}}$ from the back wall of the cavity, such that the waves are at a maximum when they strike the concentrators.

Figure 3:
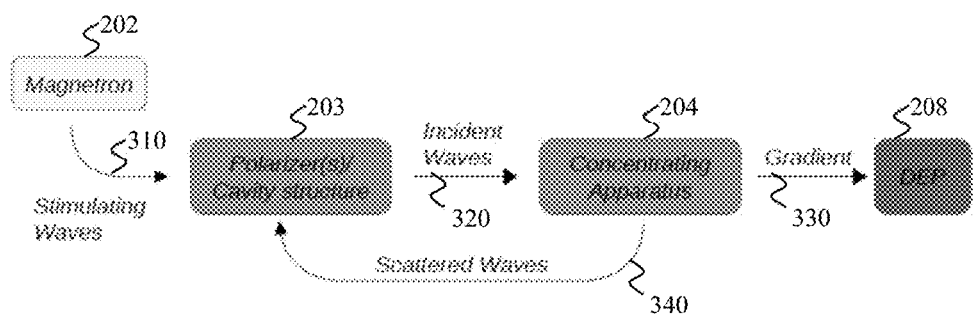
FIG. 3. An illustration depicting wave propagation and scattering in a system according to one exemplary embodiment of the disclosed subject matter.

For the purpose of illustration, and not limitation, FIG. 3 provides an illustration depicting how the waves move through the system of FIG. 2. A wave source 202 creates stimulating waves 310, which include some waves that are traveling in the resonance mode and others that are not. The stimulating waves pass through the polarizers 203, and any waves that are not traveling in the resonance mode are attenuated. The remaining waves ("incident waves") 320 are scattered by the concentrating apparatus 204, which contains the concentrators. Some scattered waves are eliminated by destructive interference. Other scattered waves pass through the gap between the concentrators and to the sample chamber 208 and undergo constructive interference with incoming incident waves to form an electric gradient 330, i.e., an isolated non-homogeneous electric field. The scattered waves 340 are reflected to the polarizers 203 and are recycled to the resonance mode.

With further reference to FIG. 2, the sample chamber 208 can be within a cooling bath 209. In certain embodiments, the sample chamber can contain a solution including semiconducting carbon nanotubes and metallic carbon nanotubes. The carbon nanotubes can migrate along the electric gradient. In certain embodiments, a capillary 210 can extract purified semiconducting carbon nanotubes and/or purified metallic carbon nanotubes from the sample chamber. In certain embodiments, the system can include multiple capillaries for extracting and/or replenishing the solution. Note that in a closed system, the capillaries must have a diameter that is much smaller than the wavelength of the electromagnetic waves such that the capillaries are not apertures by which the waves can escape the system.

Although the foregoing methods and systems are described with respect to carbon nanotubes, a person having ordinary skill in the art will appreciate that these methods and systems can be used to separate particles having diverse properties. For example, the disclosed methods and systems can be used to separate other particles beyond carbon nanotubes based on their electronic structures.

The methods and systems of the presently disclosed subject matter can provide advantages over certain existing technologies. Exemplary advantages include increased energy efficiency and recycling scattered waves to the electric gradient for dielectrophoresis. The disclosed methods and systems can be scaled up to commercial levels because less power is consumed compared to certain existing technologies.

EXAMPLES

The presently disclosed subject matter will be better understood by reference to the following Examples. These Examples are provided as merely illustrative of the disclosed methods and systems, and should not be considered as a limitation in any way.

Example 1: Calculating Effective Transverse Wavelength

In this Example, the effective transverse wavelength is calculated for one specific exemplary system of the presently disclosed subject matter. In this Example, a magnetron is used to provide waves having a frequency of 2.45 GHz and a wavelength of about 12.2 cm. A WR284 radar waveguide is used to convert waves into a single resonance mode. The waveguide has a cross-section of 7.214 cm by 3.404 cm. The waveguide has a lowest order resonance mode ($TE_{1,0}$) having a cut-off frequency of 2.07 GHz. All other cut-off frequencies exceed 4 GHz. Thus, supplying waves using a 2.45 GHz magnetron ensures wave propagation in only the $TE_{1,0}$ resonance mode. The effective transverse wavelength ($\lambda_{eff}^{1,0}$), as given by the effective wave number ($\kappa_{m,n}$), can be calculated using Formulas 7 and 8.

$$\kappa_{m,n} = \sqrt{\omega^2 \mu_0 \epsilon_0 - \left(\frac{m\pi}{a}\right)^2 - \left(\frac{n\pi}{b}\right)^2} \quad \text{(Formula 7)}$$

$$\lambda_{eff}^{1,0} = \frac{2\pi}{\kappa_{1,0}} \approx 23.1 \text{ cm} \quad \text{(Formula 8)}$$

Thus, the effective transverse wavelength of the system of this Example is about 23.1 cm. The length of the waveguide can be truncated to ensure that its length is equivalent to the effective transverse wavelength, such that the waves traveling in the resonance mode undergo a single wavelength across the length of the system.

Example 2: Calculating the Quality Factor

In this Example, the quality factor is calculated for exemplary systems of the presently disclosed subject matter. The quality factor (Q) of a resonance system describes how much energy is lost over time, taking into account the materials of the system. It can be generally described as the angular frequency ($\omega$) multiplied by the energy stored over the power lost to the finite conductivities of the materials, as represented by Formula 9.

$$Q = \omega \frac{\text{energy}}{\text{loss}} \quad \text{(Formula 9)}$$

The quality factor can be calculated for systems including a single waveguide, or multiple waveguides in parallel.

Quality Factor with One Waveguide

If the waveguide is truncated such that its length is equal to the effective transverse wavelength, as described in Example 1, the electromagnetic waves will travel in a single resonance mode $TE_{1,0,2}$ (i.e., a single mode standing wave having two antinodes). The quality factor of $TE_{1,0,2}$ can be expressed in terms of impedance ($\eta = \sqrt{\mu/\epsilon}$) and surface resistance $$\left(R_s = \sqrt{\frac{\omega \mu}{2\sigma}}\right),$$

as represented by Formula 10, where a, b, and c are, respectively, the y, x, and z dimensions of the waveguide.

$$Q_{1,0,2}^{TE} = \frac{\pi \eta}{4 R_s}(c^2 + 4a^2)^{3/2} \frac{b}{ac^3 + 2bc^3 + a^3(b+c)} \quad \text{(Formula 10)}$$

Using the same magnetron and waveguide described above, and where the waveguide is copper ($\sigma \approx 5.7 \times 10^7$ S/m) and filled with air, the quality factor is about 8551.66. Thus, this system can provide a high quality factor, corresponding to high energy efficiency.

Quality Factor with Multiple Waveguides

However, in certain embodiments, due to the limited cross-sectional area of a single waveguide, it can be desirable to provide a larger system. Therefore, multiple waveguides can be provided in parallel to increase the volume of the system. For example, multiple WR284 radar waveguides can be combined by placing them in parallel and removing the interior walls (while leaving portions of the interior walls in place as polarizers) to form a polarizing cavity. The polarizers are ⅛ of the effective transverse wavelength ($\lambda_{eff}^{1,0}$), or about 2.89 cm. In such a cavity, power losses, which negatively impact quality factor, are primarily due to the surface resistance of the interior of the cavity (i.e., proportional to the interior surface area). Thus, it is clear that the quality factor of this cavity, in which the interior walls of the waveguides are removed, will be higher than the quality factor of a system having the same number of waveguides in a series configuration. Therefore, the quality factor of the cavity can be represented as in Formula 11.

$$Q_{cavity} \geq Q_{series} \text{ where} \quad \text{(Formula 11)}$$

$$(Q_{series})^{-1} = \sum_i (Q_i)^{-1} = \frac{4}{Q_{1,0,2}^{TE}}$$

Even assuming that the quality factor of the cavity ($Q_{cavity}$) is equal to the quality factor of a series configuration ($Q_{series}$), which is the worst case scenario, a cavity containing four waveguides (i=4) has a quality factor of about 2128. Therefore, high quality factors can be achieved even using multiple waveguides.

Example 3: Power Density of the Electric Gradient

In this Example, the methods of the presently disclosed subject matter were simulated using finite difference time domain (FDTD) simulations to determine the power density (i.e., electric field strength) of the electric gradient. Four simulations were performed, each for 240 periods of simulation. The final periods were averaged to give the following results.

The first simulation modeled an unloaded case (i.e., simulated an empty sample chamber). The maximum power density of the electric field was 526.4 a.u. (all power densities are expressed in terms of arbitrary units). Because this was an unloaded case, the resonance (i.e., the standing waves) was unperturbed.

The second simulation modeled a non-polar solvent having a liquid permittivity ($\in_l$) of about 4. For example, the non-polar solvent can be a mixture of toluene and anisole. The maximum power density of the electric field was 2796.4 a.u. Compared to the first simulation (the unloaded case), the resonance was slightly perturbed.

The third simulation modeled a polar solvent having a liquid permittivity ($\in_l$) of about 80. For example, the polar solvent can be water. The maximum power density of the electric field was 357.46 a.u. Although the resonance was more perturbed than in the first and second simulations, the third simulation still created the desired electric field. That is, the maximum electric field still occurred in the gap between the concentrators. These data show that a broad range of polar and non-polar solvents can be used without destroying the resonance.

The fourth simulation modeled the same non-polar solvent as the second simulation, but introduced apertures to simulate the radiative losses, e.g., of certain existing methods. The maximum power density of the electric field was 13.04 a.u., by far the lowest of all the simulations.

Figure 4:
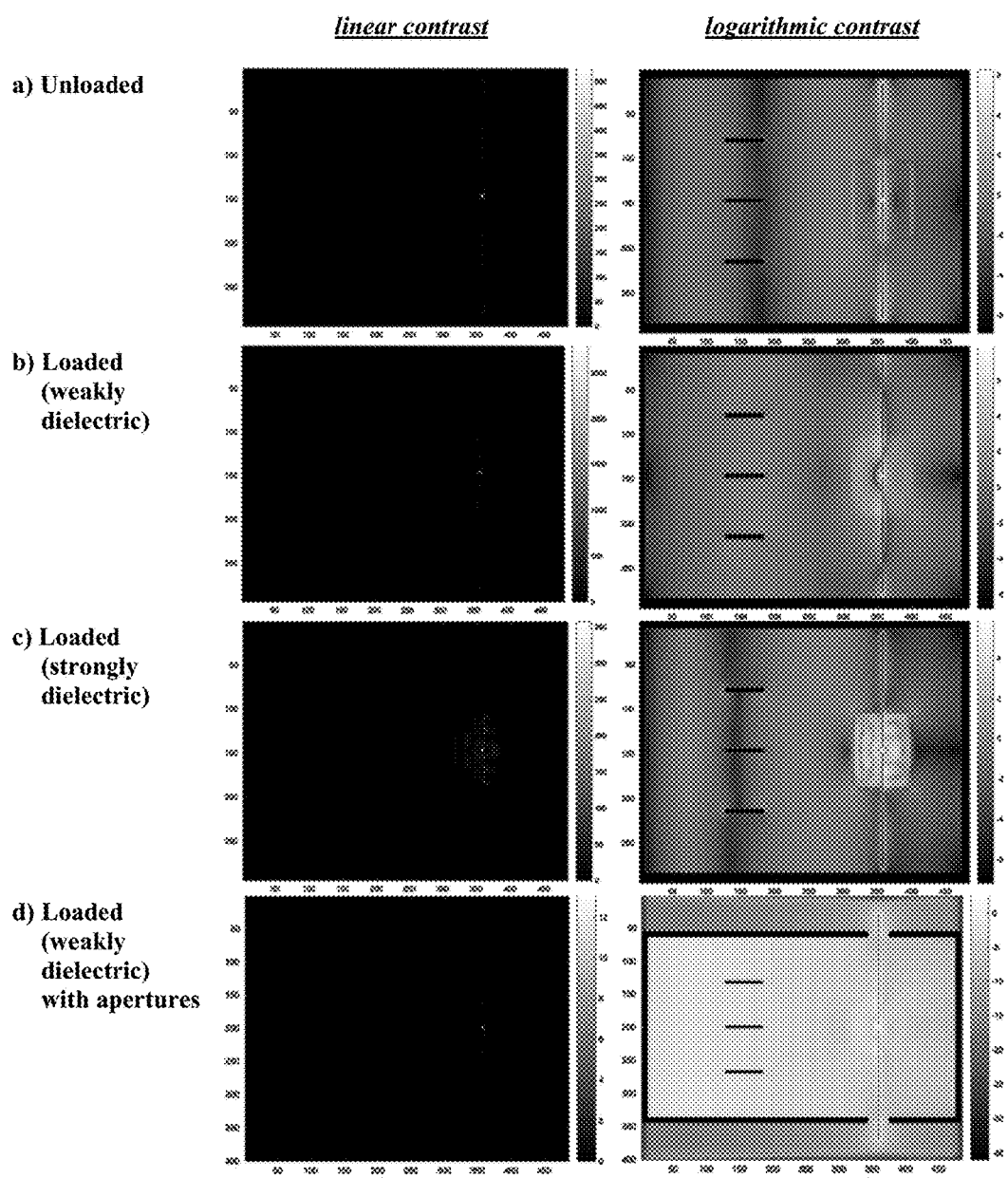
FIG. 4. Power density plots of simulations according to the exemplary embodiments of the disclosed methods.

For the purpose of illustration, FIG. 4 displays power density plots for each of the four simulations described above with linear and logarithmic contrast. However, not all of the images are plotted with the same contrast scheme. The logarithmic plots amplify the perturbations in the second, third, and fourth illustrations to increase their visibility for illustrative purposes. The electric field is visible on the plots, and is isolated between the concentrators. For instance, the power density plots of the second and third simulations, where a solvent was present and there were no radiative losses, show an isolated and intense electric field. However, when adjusted to capture relatively low power density, the logarithmic contrast plot of the fourth simulation shows intense perturbation, which illustrates the loss in power density associated with radiative losses to free space. These data show that the methods of the disclosed subject matter can create a high strength and isolated electric field for imposing the electric gradient onto a solution and separating the carbon nanotubes within the solution.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the methods and systems of the disclosed subject matter without departing from the spirit or scope of the disclosed subject matter. Thus, it is intended that the disclosed subject matter include modifications and variations that are within the scope of the appended claims and their equivalents.

What is claimed is:

1. A method of separating semiconducting carbon nanotubes and metallic carbon nanotubes contained within a solution, comprising:
    a. providing electromagnetic waves travelling in one or more resonance modes;
    b. scattering at least a portion of the electromagnetic waves to form an electric gradient with the scattered waves;
    c. recycling at least a portion of the scattered waves to the one or more resonance modes; and
    d. separating at least a portion of the semiconducting carbon nanotubes from the metallic carbon nanotubes using the electric gradient.

2. The method of claim 1, further comprising removing at least one of the semiconducting carbon nanotubes and the metallic carbon nanotubes.

3. The method of claim 1, wherein the providing comprises using a wave source.

4. The method of claim 3, wherein the providing comprises using a magnetron as the wave source.

5. The method of claim 1, wherein the electromagnetic waves travel in a single resonance mode.

6. The method of claim 1, wherein the scattering comprises using a concentrating apparatus.

7. The method of claim 1, wherein the solution comprises a solvent.

8. The method of claim 6, wherein the solvent is selected from the group consisting of water, toluene, anisole, dimethylformamide (DMF), ethanol, benzene, acetone, and combinations thereof.

9. The method of claim 6, wherein the semiconducting carbon nanotubes have a particle permittivity $\in_p^{(s)}$ and the metallic carbon nanotubes have a particle permittivity $\in_p^{(m)}$, and wherein $\in_p^{(m)}$ is not equal to $\in_p^{(s)}$.

10. The method of claim 9, wherein the solvent has a liquid permittivity $\in_l$, and wherein:

$$\in_p^{(s)} < \in_l < \in_p^{(m)}.$$

11. The method of claim 9, wherein the solvent has a liquid permittivity $\in_l$, and wherein:

$$\in_l \leq \in_p^{(s)} < \in_p^{(m)}.$$

12. The method of claim 1, wherein the electromagnetic waves have a frequency from about 300 MHz to about 300 GHz.

13. The method of claim 1, wherein the electromagnetic waves have a frequency of about 2 GHz to about 4 GHz.

14. A system for separating semiconducting carbon nanotubes and metallic carbon nanotubes within a cavity having a certain length, comprising:
    a. a wave source, adapted for placement within the cavity, for providing electromagnetic waves to the cavity, wherein at least a portion of the electromagnetic waves travel in a resonance mode;
    b. a concentrating apparatus, adapted for placement within the cavity, for scattering the electromagnetic waves; and
    c. a sample chamber, within the concentrating apparatus, wherein:
        i. the sample chamber comprises a solution comprising the semiconducting carbon nanotubes and the metallic carbon nanotubes; and
        ii. at least a portion of the scattered waves travel through the sample chamber.

15. The system of claim 14, wherein the electromagnetic waves have an effective transverse wavelength $\lambda_{eff}$ and the length of the cavity is an integer half multiple of $\lambda_{eff}$.

16. The system of claim 14, wherein the electromagnetic waves have an effective transverse wavelength $\lambda_{eff}$ that is equal to the length of the cavity.

17. The system of claim 16, further comprising one or more polarizers for attenuating electromagnetic waves that are not traveling in the resonance mode, if any.

18. The system of claim 17, wherein the electromagnetic waves have an effective transverse wavelength $\lambda_{eff}$, and wherein the polarizers have a width of $\frac{1}{8}\lambda_{eff}$.

19. The system of claim 17, wherein the wave source is located a distance of $\frac{1}{4}\lambda_{eff}$ from a first end of the cavity.

20. The system of claim 19, wherein the scattering apparatus further comprises one or more concentrators.

21. The system of claim 20, wherein the one or more concentrators are located a distance of $\frac{1}{4}\lambda_{eff}$ from a second end of the cavity, wherein the second end is opposite the first end.

22. The system of claim 14, wherein the wave source is a magnetron.

23. The system of claim 14, wherein the sample chamber is within a cooling bath, and wherein the cooling bath is within the concentrating apparatus.

24. The system of claim 14, further comprising a capillary extending from the sample chamber for removing the semi-conducting carbon nanotubes and/or the metallic carbon nanotubes from the sample chamber.

* * * * *